(12) United States Patent
Shao et al.

(10) Patent No.: US 11,599,095 B1
(45) Date of Patent: Mar. 7, 2023

(54) INDUSTRIAL INTERNET OF THINGS, CONTROL METHODS, AND STORAGE MEDIUMS FOR HANDLING FAILURE OF ASSEMBLY LINE EQUIPMENT

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/817,986

(22) Filed: Aug. 6, 2022

(30) Foreign Application Priority Data

Jun. 10, 2022 (CN) .......................... 202210651065.7

(51) Int. Cl.
  *G05B 19/418* (2006.01)
  *G16Y 10/25* (2020.01)
  *G16Y 40/40* (2020.01)

(52) U.S. Cl.
  CPC .......... *G05B 19/4184* (2013.01); *G16Y 10/25* (2020.01); *G16Y 40/40* (2020.01);
  (Continued)

(58) Field of Classification Search
  CPC ...... G05B 19/4184; G05B 2219/31337; G05B 2219/33112; G05B 13/024; G05B 2219/32235; G05B 2219/32015; G16Y 40/40; G16Y 10/25; G06Q 10/06; G06Q 10/0631; G16Z 99/00
  See application file for complete search history.

(56) References Cited

U.S. PATENT DOCUMENTS

| 10,575,072 B1 * | 2/2020 | Shao ........................ H04Q 9/00 |
| 2020/0293997 A1 * | 9/2020 | Shao ...................... G08B 21/18 |

FOREIGN PATENT DOCUMENTS

| CN | 106302683 A | 1/2017 |
| CN | 108200123 A | 6/2018 |

(Continued)

OTHER PUBLICATIONS

Decision to Grant a Patent in Chinese Application No. 202210651065.7 dated Jul. 26, 2022, 5 pages.

*Primary Examiner* — Soe Hlaing
(74) *Attorney, Agent, or Firm* — Metis IP LLC

(57) ABSTRACT

The present disclosure provides an Industrial Internet of Things and a control method of an Industrial Internet of Things for handling failure of an assembly line equipment. The Industrial Internet of Things include a user platform, a service platform, a management platform, a sensor network platform, and an object platform interacting in sequence. The service platform, the management platform, and the sensor network platform all adopt an independent arrangement. The object platform is configured as a plurality of manufacturing equipment arranged in sequence according to a process sequence on the assembly line, and each of the manufacturing equipment separately corresponds to the service platform, the management platform, and the sensor network platform.

6 Claims, 4 Drawing Sheets

(52) U.S. Cl.
CPC ............ *G05B 2219/31337* (2013.01); *G05B 2219/33112* (2013.01)

(56) References Cited

FOREIGN PATENT DOCUMENTS

| | | |
|---|---|---|
| CN | 110048892 A | 7/2019 |
| CN | 111158328 A | 5/2020 |
| CN | 114253774 A | 3/2022 |
| CN | 114449023 A | 5/2022 |

\* cited by examiner

US 11,599,095 B1

INDUSTRIAL INTERNET OF THINGS, CONTROL METHODS, AND STORAGE MEDIUMS FOR HANDLING FAILURE OF ASSEMBLY LINE EQUIPMENT

CROSS-REFERENCE TO RELATED DISCLOSURES

This application claims priority to Chinese Patent Application No. 202210651065.7, filed on Jun. 10, 2022, the entire contents of which are hereby incorporated by reference.

TECHNICAL FIELD

The present disclosure relates to intelligent manufacturing technology, and in particular to Industrial Internet of Things, control methods, and storage mediums for handling failure of assembly line equipment.

BACKGROUND

Intelligent manufacturing equipment is set in sequence according to the automatic production assembly line, and the processing or assembly of the product is completed in sequence according to the process setting, so as to realize intelligent manufacturing.

Intelligent manufacturing equipment can realize automated product manufacturing operations based on automation technology. The equipment is prone to failures because of its high degree of automation, mostly circuit structure failures and mechanical structure failures. In the past, after failures occurred, the equipment was basically troubleshooting manually after an error was reported. Troubleshooting workers cannot obtain detailed failure information in advance. Regardless of the size of the failure, it is necessary to go to the site, and when troubleshooting, it is necessary to suspend the failure equipment and shut down the upstream equipment. These will cause unnecessary labor costs and manufacturing costs, which are not conducive to the automatic and rapid production of intelligent manufacturing and the production coordination of the entire assembly line and brings many problems to intelligent manufacturing.

SUMMARY

The technical problem to be solved by this disclosure is to provide an Industrial Internet of Things for handling failure of an assembly line equipment, and the Internet of Things independently handles the failure of each manufacturing equipment respectively through the sensor network platform, the management platform, and the service platform set independently. It can not only process a part of handling failure, but also obtain the failure cause and failure location in advance according to the failure information, and adjust the equipment work according to the upstream equipment manufacturing conditions, thereby reducing the cost of manual handling failure and ensuring the normal production and manufacturing of the assembly line.

The invention realizes by following technical scheme: an Industrial Internet of Things for handling failure of an assembly line equipment. The Industrial Internet of Things may comprise: a user platform, a service platform, a management platform, a sensor network platform, and an object platform interacting in sequence. The service platform, the management platform, and the sensor network platform all adopt an independent arrangement, and the independent arrangement may mean that the service platform, the management platform, or the sensor network platform uses different sub-platforms for data storage, data processing, and/or data transmission for data of different object platforms. The object platform may be configured as a plurality of manufacturing equipment arranged in sequence according to a process sequence on the assembly line, and each of the manufacturing equipment may correspond to the service platform, the management platform, and the sensor network platform, when any of the manufacturing equipment fails, the manufacturing equipment uploads a failure code to sub-platforms of the sensor network platform. Sub-platforms of the management platform may be configured to receive a configuration file sent by the sub-platforms of the sensor network platform, identify the configuration file, and issue a self-repair instruction to the sub-platforms of the sensor network platform based on an identified result, the sub-platforms of the sensor network platform converts the self-repair instruction into a self-repair instruction file recognized by the manufacturing equipment and issues the self-repair instruction file to the manufacturing equipment, and the manufacturing equipment may perform a self-repair based on the self-repair instruction file, feed back a self-repair result to the sub-platforms of the management platform, and determine a repair method based on the self-repair result. In response to a determination that the repair method is intelligent repair, a failure handling instruction may be determined, and the failure handling instruction may be sent to the sub-platforms of the sensor network platform. In response to a determination that the repair method is manual repair, the identified result and the self-repair result may be upload to sub-platforms of the service platform, the sub-platforms of the service platform synchronously send the identified result and the self-repair result to the user platform. The user platform may be configured to obtain the failure handling instruction based on the identified result and the self-repair result, and sequentially send the failure handling instruction to the sub-platforms of the sensor network platform through the sub-platforms of the service platform and the sub-platforms of the management platform in turn. The sub-platforms of the sensor network platform may be configured to convert the failure code into the configuration file identifiable by the management platform, and send the configuration file to the sub-platforms of the management platform, and convert the failure handling instruction into a failure handling instruction file identifiable by the manufacturing equipment, and issue the failure handling instruction file to the manufacturing equipment, and the manufacturing equipment may execute a failure handling based on the failure handling instruction file.

Based on above technical scheme, a repair method may be determined based on the self-repair result, at least one processor may be executed to operations including: obtaining at least one first corresponding sub-graph in a repairing knowledge graph based on the self-repair result; determining at least one subsequent repair event based on the at least one first corresponding sub-graph; determining a first score of the at least one subsequent repair event based on the at least one subsequent repair event in the at least one first corresponding sub-graph; and determining whether the first score is greater than a first threshold; and in response to a determination that the first score is greater than the first threshold, determining the repair method is the intelligent repair.

Based on above technical scheme, nodes of the repairing knowledge graph may include the self-repair result, and nodes of the at least one first corresponding sub-graph include the at least one subsequent repair event.

Based on above technical scheme, in response to a determination that the repair method is intelligent repair, a failure handling instruction may be determined, the at least one processor may be executed to operations including: obtaining at least one group through clustering according to a set of handling actions based on the at least one subsequent repair event, determining a second score of the at least one set of handling actions based on the at least one set of handling actions in the at least one group; and using a set of handling actions with a highest second score as the failure handling instruction.

Based on above technical scheme, in response to a determination that the repair method is intelligent repair, a failure handling instruction may be determined, the at least one processor may be executed to operations further including: determining whether the second score is less than a second threshold, and in response to a determination that the second score is less than the second threshold, obtaining a second corresponding sub-graph with a wider range in the repairing knowledge graph, and the second threshold is greater than the first threshold.

Based on above technical scheme, the sub-platforms of the management platform may be further configured to: pre-store a failure code table corresponding to the manufacturing equipment, the failure code table may at least include the failure code, and a failure type, and a self-repair instruction package corresponding to the failure code, and after receiving the configuration file, the failure code in the configuration file may be extracted and the failure code with the failure code table may be matched, the failure type and the self-repair instruction package may be retrieved corresponding to the failure code, and package the failure code, failure type, and the self-repair instruction package as the identification result.

Based on above technical scheme, the self-repair instruction issued by the sub-platforms of the management platform may at least include the self-repair instruction package, and after receiving the self-repair instruction file, the manufacturing equipment may extract the self-repair instruction operation program data in the self-repair instruction package to perform self-repair.

Based on above technical scheme, the failure code table may also include an estimated failure handling time corresponding to the failure code, the sub-platforms of the management platform may further be configured to: package the estimated failure handling time, the failure code, the failure type, and the self-repair instruction package as the identification result and upload the identification result to the sub-platforms of the service platform, take a previous manufacturing equipment of failed manufacturing equipment as a target object, wherein the sub-platforms of the management platform corresponding to the target object obtain a temporary storage amount of products of the target object and a production time of a single product, and upload the temporary storage amount of products of the target object and the production time of the single product to the sub-platforms of the service platform corresponding to the target object, the user platform may further be configured to: retrieve the temporary storage amount of products and the production time of the single product of the sub-platforms of the service platform corresponding to the target object, extract the estimated failure handling time of the identification result, and calculate a total product production amount of the target object within the estimated failure handling time through the estimated failure handling time and the production time of the single product, determine whether to activate a standby manufacturing equipment and use a determination result as a part of the failure handling instruction based on a difference between the total product production amount and the temporary storage amount of products. When the sub-platforms of the management platform of the failed manufacturing equipment receive the failure handling instruction and issue the failure handling instruction to the sub-platforms of the sensor network platform at the same time, whether to execute a step of enabling the standby manufacturing equipment may be determined based on the determination result.

Based on above technical scheme, whether to execute a step of enabling the standby manufacturing equipment may be determined based on the determination result, the at least one processor may be executed to operations including: the standby manufacturing equipment and the failed manufacturing equipment sharing one sub-platform of same management platform and one sub-platform of the sensor network platform, when the determination result is to enable the standby manufacturing equipment, the sub-platforms of the management platform generating an enabling command and sending the enabling command to the sub-platforms of the sensor network platform corresponding to the standby manufacturing equipment; and after converting the enabling command, the sub-platforms of the sensor network platform corresponding to the standby manufacturing equipment sending it to the standby manufacturing equipment, and the standby manufacturing equipment starting to replace the failed manufacturing equipment to manufacture products based on the enabling command.

Based on above technical scheme, the failure code table may further include a production time of a single product corresponding to the failed manufacturing equipment, the sub-platforms of the management platform may further be configured to sum the estimated failure handling time corresponding to the failure code and the production time of the single product corresponding to the failed manufacturing equipment as a final estimated failure handling time, and the user platform may be configured to calculate the total product production amount of the target object through the final estimated failure handling time and the production time of the single product of the target object.

Based on the above Industrial Internet of Things for handling failure of an assembly line equipment, the present disclosure may also provide a control method of an Industrial Internet of Things for handling failure of an assembly line equipment, the Industrial Internet of Things for handling failure of the assembly line equipment may comprise: a user platform, a service platform, a management platform, a sensor network platform, and an object platform interacting in sequence. The service platform, the management platform and the sensor network platform all adopt an independent arrangement, and the independent arrangement may mean that the service platform, the management platform, or the sensor network platform uses different sub-platforms for data storage, data processing, and/or data transmission for data of different object platforms. The object platform may be configured as a plurality of manufacturing equipment arranged in sequence according to a process sequence on the assembly line, and each of the manufacturing equipment may correspond to the service platform, the management platform, and the sensor network platform. The control method may comprise following operations: when any of the manufacturing equipment fails, a failure code to sub-platforms of the sensor network platform may be uploaded by the manufacturing equipment, the failure code may be converted into a configuration file identifiable by the management platform, and the configuration file may be sent to the sub-platforms of the management platform by the sub-platforms of the sensor network platform. Sub-platforms of the management platform may receive a configuration file sent by the sub-platforms of the sensor network platform, identify the configuration file, and issue a self-repair instruction to the sub-platforms of the sensor network platform based on an identified result, wherein the sub-platforms of the sensor network platform converts the self-repair instruction into a self-repair instruction file recognized by the manufacturing equipment and issues the self-repair instruction file to the manufacturing equipment, and the manufacturing equipment may perform a self-repair based on the self-repair instruction file and feed back a self-repair result to the sub-platforms of the management platform. The sub-platforms of the management platform may determine a repair method based on the self-repair result. In response to a determination that the repair method is intelligent repair, a failure handling instruction may be determined, and the failure handling instruction may be sent to the sub-platforms of the sensor network platform. In response to a determination that the repair method is manual repair, the identified result and the self-repair result may be uploaded to sub-platforms of the service platform, wherein the sub-platforms of the service platform synchronously send the identified result and the self-repair result to the user platform, the user platform may obtain the failure handling instruction based on the identified result and the self-repair result, and sequentially send the failure handling instruction to the sub-platforms of the sensor network platform through the sub-platforms of the service platform and the sub-platforms of the management platform in turn. The sub-platforms of the sensor network platform may convert the failure handling instruction into a failure handling instruction file identifiable by the manufacturing equipment and issue the failure handling instruction file to the manufacturing equipment, and the manufacturing equipment may execute a failure handling based on the failure handling instruction file.

Based on the above Industrial Internet of Things for handling failure of an assembly line equipment, the present disclosure may also provide a non-transitory computer-readable storage medium for storing computer instructions, when reading the computer instructions in the storage medium, a computer implements the method for handling failure of an assembly line equipment.

Compared with the prior art, the beneficial effects of the present disclosure are as follows: in the Industrial Internet of Things and the control method for handling failure of assembly an line equipment of the present disclosure, the Internet of Things is build based on the five-platform structure, the sensor network platform, the management platform, and service platform are all adopt an independent arrangement, so that independent sensor network, service and management platforms can be used for different manufacturing equipment to form independent data processing, management and transmission paths, reducing the data processing volume and transmission of each platform. It reduces the computing pressure and transmission pressure of a single platform of the entire Internet of Things, and it is also easy to find failed manufacturing equipment, which not only reduces the difficulty and cost of building the Internet of Things, but also ensures the accuracy and timeliness of handling failure.

When in use, the present disclosure combines the Industrial Internet of Things and the control method for handling failure of the assembly line equipment. By uploading the failure code after the manufacturing equipment fails, the transmission, identification, processing and failure handling of the failure code are all carried out using an independent and unique data path, which effectively ensures the accuracy and timeliness of the information in the process of handling failure. Secondly, by classifying the failure codes, pre-processing through self-repair, and then issuing different failure handling instructions based on the repair results, other handling instructions can be issued after the failure problem and pre-handling can be determined, thereby improving the accuracy of failure handling, reducing the on-site attendance rate of troubleshooting personnel. When troubleshooting, it can also choose the opening and closing of the standby manufacturing equipment during troubleshooting based on the troubleshooting time and the output of upstream equipment, so as to minimize the impact on the entire production line equipment during troubleshooting and ensure the normal operation of the assembly line.

BRIEF DESCRIPTION OF THE DRAWINGS

The accompanying drawings described herein are used to provide a further understanding of the embodiments of the present disclosure, constitute a part of the present application, and do not constitute a limitation to the embodiments of the invention. In the drawings.

DETAILED DESCRIPTION

In order to make the purpose of the invention, technical scheme and advantage clearer, below in conjunction with embodiments and accompanying drawings, the present disclosure is described in further detail, and the schematic embodiments of the present disclosure and its explanation are only used to explain the present disclosure, not as a limitation of the invention.

Figure 1:
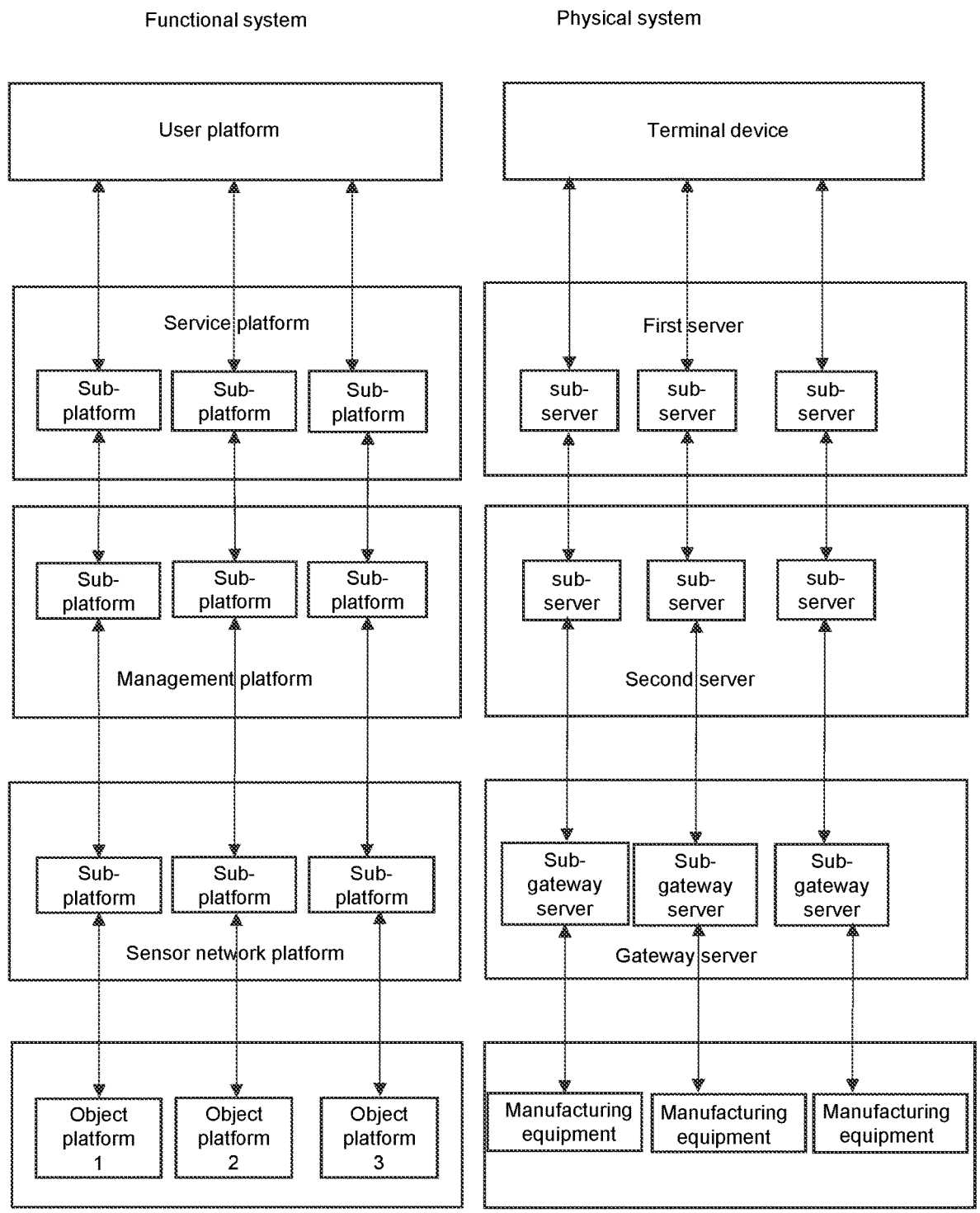
FIG. 1 illustrates a structural frame diagram of the Industrial Internet of Things for handling failure of the assembly line equipment according to some embodiments of the present disclosure.

As shown in FIG. 1, the first embodiment of the present invention aims to provide an Industrial Internet of Things for handling failure of an assembly line equipment and the Industrial Internet of Things may include: a user platform, a service platform, a management platform, a sensor network platform, and an object platform interacting in sequence.

The service platform, the management platform, and the sensor network platform may all adopt an independent arrangement, and the independent arrangement may mean that the service platform, the management platform, or the sensor network platform uses different sub-platforms for data storage, data processing, and/or data transmission for data of different object platforms. The object platform may be configured as a plurality of manufacturing equipment arranged in sequence according to a process sequence on the assembly line, and each of the manufacturing equipment separately corresponds to the service platform, the management platform, and the sensor network platform.

When any of the manufacturing equipment fails, the manufacturing equipment may upload a failure code to sub-platforms of the sensor network platform.

The sub-platforms of the sensor network platform may convert the failure code into a configuration file identifiable by the management platform and send the configuration file to the sub-platforms of the management platform.

Sub-platforms of the management platform may receive a configuration file sent by the sub-platforms of the sensor network platform, identify the configuration file, and issue a self-repair instruction to the sub-platforms of the sensor network platform based on an identified result, the sub-platforms of the sensor network platform converts the self-repair instruction into a self-repair instruction file recognized by the manufacturing equipment and issues the self-repair instruction file to the manufacturing equipment, and the manufacturing equipment may perform a self-repair based on the self-repair instruction file, and feed back a self-repair result to the sub-platforms of the management platform.

The sub-platforms of the management platform may determine a repair method based on the self-repair result, in response to a determination that the repair method is intelligent repair, a failure handling instruction may be determined, and the failure handling instruction may be sent to the sub-platforms of the sensor network platform, in response to a determination that the repair method is manual repair, the identified result and the self-repair result may be uploaded to sub-platforms of the service platform, the sub-platforms of the service platform synchronously send the identified result and the self-repair result to the user platform, the user platform may obtain the failure handling instruction based on the identified result and the self-repair result, and sequentially send the failure handling instruction to the sub-platforms of the sensor network platform through the sub-platforms of the service platform and the sub-platforms of the management platform in turn.

The sub-platforms of the sensor network platform may convert the failure handling instruction into a failure handling instruction file identifiable by the manufacturing equipment and issue the failure handling instruction file to the manufacturing equipment, and the manufacturing equipment may execute a failure handling based on the failure handling instruction file.

As an existing Internet of Things architecture, the user platform may be configured as a terminal device, which interacts with users. The service platform may be configured as a first server, which receives an instruction from the user platform and send the instruction to the management platform, extracts the information needed to process the user platform from the management platform, and sends the information to the user platform. The management platform may be configured as a second server, which controls the operation of the object platform and receives feedback data from the object platform. The sensor network platform may be configured as a communication network and a gateway for the object platform and the management platform interacting.

In the prior art, the intelligent manufacturing equipment on the intelligent production line or the intelligent assembly line mostly performs their own duties, and different manufacturing equipment participates in the product manufacturing or assembling of different structures of products or different processes, etc. Manufacturing equipment needs to repeat fixed actions hundreds of times a day under automatic control. The actions of manufacturing equipment are mostly controlled by programs, and the actions are repeated by actuators. Due to the many repetitions of the actions of the manufacturing equipment and the influence of the working environment, the control system of the manufacturing equipment may have a program failure problem due to the repeated operation of a single program. At the same time, due to the repeated operation of the actuator, the actuators often cause execution errors (such as reduced positioning accuracy, increased positioning errors, etc.) due to wear, displacement, and key structure shedding, etc., and then execution failures occur. These are common faults in manufacturing equipment. When a failure occurs in the prior art, it is generally that the manufacturing equipment or its monitoring system sends out failure notification information, and the troubleshooters troubleshoot on the site. Because some failure problems such as program failure, increased positioning error of the actuator, etc., can be overcome by restarting the manufacturing equipment, restoring factory values, repositioning errors, etc., without the need for troubleshooting personnel to deal with. Moreover, after obtaining the failure notification, most of the manufacturing equipment cannot respond to the detailed failure information, so the troubleshooting personnel need to confirm the failure on site, which is time-consuming and labor-intensive. In addition, when the failure needs to be eliminated and it takes a long time, most of the existing assembly lines need to open the standby manufacturing equipment and need to close the upstream manufacturing equipment of the relevant assembly line regularly, which may inevitably affect the product manufacturing of the entire assembly line.

In the Industrial Internet of Things and the control method for handling failure of the assembly line equipment, the Internet of Things is built based on the five-platform structure. The sensor network platform, the management platform, and service platform are all adopt an independent arrangement, so that independent sensor network, service and management platforms can be used for different manufacturing equipment to form independent data processing, management and transmission paths, reducing the data processing volume and transmission of each platform. It reduces the computing pressure and transmission pressure of a single platform of the entire Internet of Things, and it is also easy to find failed manufacturing equipment, which not only reduces the difficulty and cost of building the Internet of Things, but also ensures the accuracy and timeliness of handling failure.

When in use, the present disclosure combines the Industrial Internet of Things and the control method for handling failure of an assembly line equipment. By uploading the failure code after the manufacturing equipment fails, the transmission, identification, and processing of the failure code, and failure handling are all carried out using an independent and unique data path, which effectively ensures the accuracy and timeliness of the information in the process of handling failure. Secondly, by classifying the failure codes, pre-processing through self-repair, and then issuing different failure handling instructions based on the repair results, other handling instructions can be issued after the failure problem and pre-handling can be determined, thereby improving the accuracy of failure handling, reducing the on-site attendance rate of troubleshooting personnel. When troubleshooting, it can also choose the opening and closing of the standby manufacturing equipment during troubleshooting based on the troubleshooting time and the output of upstream equipment, so as to minimize the impact on the entire production line equipment during troubleshooting and try to avoid inconvenience to product manufacturing caused by shutting down upstream manufacturing equipment to ensure the normal operation of the assembly line.

It should be noted that the user platform in this embodiment may be a desktop computer, a tablet computer, a notebook computer, a mobile phone, or other electronic equipment capable of data processing and data communication, which is not limited here. In a specific application, the first server and the second server may be a single server or a server cluster, which is not limited here. It should be understood that the process of data processing mentioned in the embodiment may be processed by the processor of the server, and the data stored in the server may be stored in a storage device of the server, such as a hard disk or other memory. In specific applications, the sensor network platform may use multiple sets of gateway servers or multiple sets of intelligent routers, which are not limited here. It should be understood that the process of data processing mentioned in the embodiments of the application may be processed by the processor of the gateway server, and the data stored in the gateway server may be stored in the storage device of the gateway server, such as hard disks and SSD.

Further descriptions, in the industrial Internet of Things for handling failure of the assembly line equipment, the sensor network platform, the management platform, and the service platform all adopt a plurality of (same number) sub-platforms to form an independent arrangement. The plurality of sub-platforms of different platforms form a one-to-one correspondence between the upper and lower levels, and each group of corresponding sensor network platforms, management platforms, and service platforms all correspond to the same manufacturing equipment. As a result, separately data processing, transmission and storage of different manufacturing equipment can be realized, which reduces the overall data processing, transmission and storage capabilities of each platform. In addition, the data of different manufacturing equipment can be performed separately to avoid data errors, the data source is clear, and it can also ensure the independent safety control of the manufacturing equipment, and accurately locate the failed manufacturing equipment.

In some embodiments, the sub-platform of the management platform may receive the configuration file and identify, and the specific identification mode is that: the sub-platforms of the management platform may pre-store a failure code table corresponding to the manufacturing equipment, the failure code table may at least include the failure code, and a failure type, and a self-repair instruction package corresponding to the failure code; after receiving the configuration file, the sub-platform of the management platform may extract the failure code in the configuration file and match the failure code with the failure code table, retrieve the failure type and the self-repair instruction package corresponding to the failure code, and package the failure code, failure type, and the self-repair instruction package as the identification result.

In a specific application, a plurality of failure codes may be pre-stored in the failure code table, and each failure code correspond to its failure type and self-repair instruction package. Therefore, in the subsequent failure handling, the failure location and direction may be precisely located through the failure code and failure type, so as to quickly troubleshoot. At the same time, based on some repairable failure types, self-repair troubleshooting may also be performed based on self-repair instruction packages, reducing the workload of troubleshooting.

Specifically, the self-repair instruction issued by the sub-platforms of the management platform at least include the self-repair instruction package, and after receiving the self-repair instruction file, the manufacturing equipment may extract the self-repair instruction operation program data in the self-repair instruction package to perform self-repair.

After the manufacturing equipment performs self-repaired, the failure may not necessarily be eliminated, and other troubleshooting measures need to be carried out at this time. Based on this, in some embodiments, the sub-platforms of the management platform may determine the repair method based on the self-repair results. In response to a determination that the repair method is intelligent repair, a failure handling instruction may be determined, and the failure handling instruction may be sent to the sub-platforms of the sensor network platform. In response to a determination that the repair method is manual repair, the identified result and the self-repair result may be upload to sub-platforms of the service platform, the sub-platforms of the service platform synchronously send the identified result and the self-repair result to the user platform.

The failure code table may also include an estimated failure handling time corresponding to the failure code. The sub-platforms of the management platform may further be configured to package the estimated failure handling time, the failure code, the failure type, and the self-repair instruction package as the identification result and upload the identification result to the sub-platforms of the service platform. Taking a previous manufacturing equipment of failed manufacturing equipment as a target object, the sub-platforms of the management platform corresponding to the target object obtain a temporary storage amount of products of the target object and a production time of a single product, and upload the temporary storage amount of products of the target object and the production time of the single product to the sub-platforms of the service platform corresponding to the target object.

The user platform may retrieve the temporary storage amount of products and the production time of the single product of the sub-platforms of the service platform corresponding to the target object.

The user platform may extract the estimated failure handling time of the identification result and calculate a total product production amount of the target object within the estimated failure handling time through the estimated failure handling time and the production time of the single product.

It is determined whether to enable a standby manufacturing equipment based on a difference between the total product production amount and the temporary storage amount of products and a determination result may be used as a part of the failure handling instruction. When the sub-platforms of the management platform of the failed manufacturing equipment receive the failure handling instruction and then issue the failure handling instruction to the sub-platforms of the sensor network platform, it is determined whether to execute a step of enabling the standby manufacturing equipment based on the determination result.

In the prior art, general manufacturing equipment has a product cache structure or area, which is used to cache some manufactured products to prevent products from entering the next manufacturing equipment and causing product accumulation in the next manufacturing equipment area, so as to affect production. However, there are certain requirements for the temporary storage amount of cached products. If this amount is exceeded, it will affect the manufacturing equipment and its next manufacturing equipment. Therefore, when other troubleshooting measures are required, it may affect the normal operation of the upstream equipment of the assembly line. Based on this, through the above method, by reasonably calculating the difference between the total product production amount of the previous manufacturing equipment and the temporary storage amount of the product within the estimated failure handling time, it may be judged whether it is necessary to enable standby equipment, or whether it is necessary to stop upstream manufacturing equipment or reduce upstream equipment production, so as to minimize the impact on upstream equipment. In addition, it may also control the failure handling time in reverse, so that the upstream equipment may work normally and ensure the normal operation of the assembly line.

In some embodiments, when the manufacturing equipment is configured with a matching standby manufacturing equipment, determining whether to execute a step of enabling the standby manufacturing equipment based on the determination result include operations.

The standby manufacturing equipment and the failed manufacturing equipment may share one sub-platform of same management platform and one sub-platform of the sensor network platform.

When the determination result is to enable the standby manufacturing equipment, the sub-platforms of the management platform may generate an enabling command and send the enabling command to the sub-platforms of the sensor network platform corresponding to the standby manufacturing equipment.

After converting the enabling command, the sub-platforms of the sensor network platform corresponding to the standby manufacturing equipment may send it to the standby manufacturing equipment, and the standby manufacturing equipment may start to replace the failed manufacturing equipment to manufacture products based on the enabling command.

In the specific application, when the total product production amount of the upstream equipment is less than the temporary storage amount of the product, it is explained that the standby equipment does not need to be turned on during the troubleshooting time, and the upstream equipment does not need to be adjusted, and the standby equipment may not be turned on when troubleshooting at this time. However, when the production time of a single product of the failure manufacturing equipment is relatively long and the production is carried out after the failure is eliminated, it may also cause the total product production amount of the upstream equipment to be greater than the temporary storage amount due to the long production time of the single product. As a result, the upstream equipment needs to stop production or slow down the processing speed after a certain period of time, which will also affect the product manufacturing of the entire assembly line.

Based on this, the failure code table may further include the production time of the single product corresponding to the failed manufacturing equipment. The estimated failure handling time corresponding to the failure code and the production time of the single product corresponding to the failed manufacturing equipment may be summed as a final estimated failure handling time. The user platform may be configured to calculate the total product production amount of the target object through the final estimated failure handling time and the production time of the single product of the target object.

Through the above methods, when processing, the production time of a single product of the failed manufacturing equipment is also calculated in the estimated failure handling time, so as to ensure that the manufacturing equipment of the entire assembly line can be used normally after the failure is eliminated.

Figure 2:
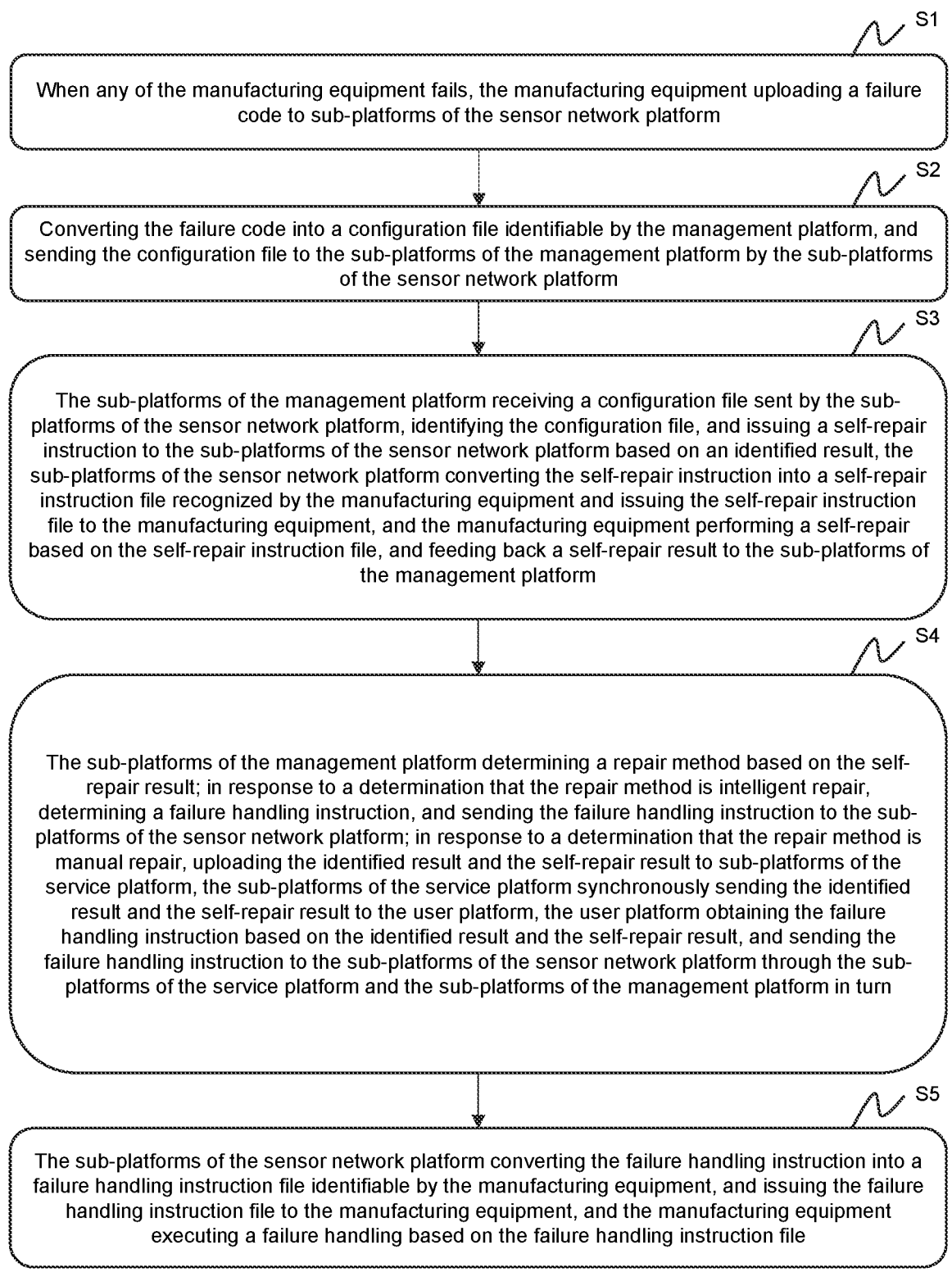
FIG. 2 illustrates a flowchart of a control method for handling failure of the assembly line equipment according to some embodiments of the present disclosure.

As shown in FIG. 2, a second embodiment of the invention provides a control method of the Industrial Internet of Things for handling failure of the assembly line equipment, the Industrial Internet of Things for handling failure of the assembly line equipment may include: a user platform, a service platform, a management platform, a sensor network platform, and an object platform interacting in sequence.

The service platform, the management platform, and the sensor network platform may all adopt an independent arrangement, and the independent arrangement may mean that the service platform, the management platform, or the sensor network platform uses different sub-platforms for data storage, data processing, and/or data transmission for data of different object platforms. The object platform may be configured to a plurality of manufacturing equipment arranged in sequence on the assembly line according to a process sequence, and each of the manufacturing equipment may separately correspond to the service platform, the management platform, and the sensor network platform.

The control method may include the following operations.

When any of the manufacturing equipment fails, the manufacturing equipment may upload a failure code to sub-platforms of the sensor network platform.

The sub-platforms of the sensor network platform may convert the failure code into a configuration file identifiable by the management platform and send the configuration file to the sub-platforms of the management platform.

The sub-platforms of the management platform may receive a configuration file sent by the sub-platforms of the sensor network platform, identify the configuration file, and issue a self-repair instruction to the sub-platforms of the sensor network platform based on an identified result, the sub-platforms of the sensor network platform convert the self-repair instruction into a self-repair instruction file recognized by the manufacturing equipment and issues the self-repair instruction file to the manufacturing equipment, and the manufacturing equipment may perform a self-repair based on the self-repair instruction file, and feed back a self-repair result to the sub-platforms of the management platform.

The sub-platforms of the management platform may determine a repair method based on the self-repair result. In response to a determination that the repair method is intelligent repair, a failure handling instruction may be determine, and the failure handling instruction may be sent to the sub-platforms of the sensor network platform. In response to a determination that the repair method is manual repair, the identified result and the self-repair result may be uploaded to sub-platforms of the service platform, the sub-platforms of the service platform synchronously send the identified result and the self-repair result to the user platform, the user platform may obtain the failure handling instruction based on the identified result and the self-repair result, and sequentially send the failure handling instruction to the sub-platforms of the sensor network platform through the sub-platforms of the service platform and the sub-platforms of the management platform in turn.

The sub-platforms of the sensor network platform may convert the failure handling instruction into a failure handling instruction file identifiable by the manufacturing equipment and issue the failure handling instruction file to the manufacturing equipment, and the manufacturing equipment may execute a failure handling based on the failure handling instruction file.

Figure 3:
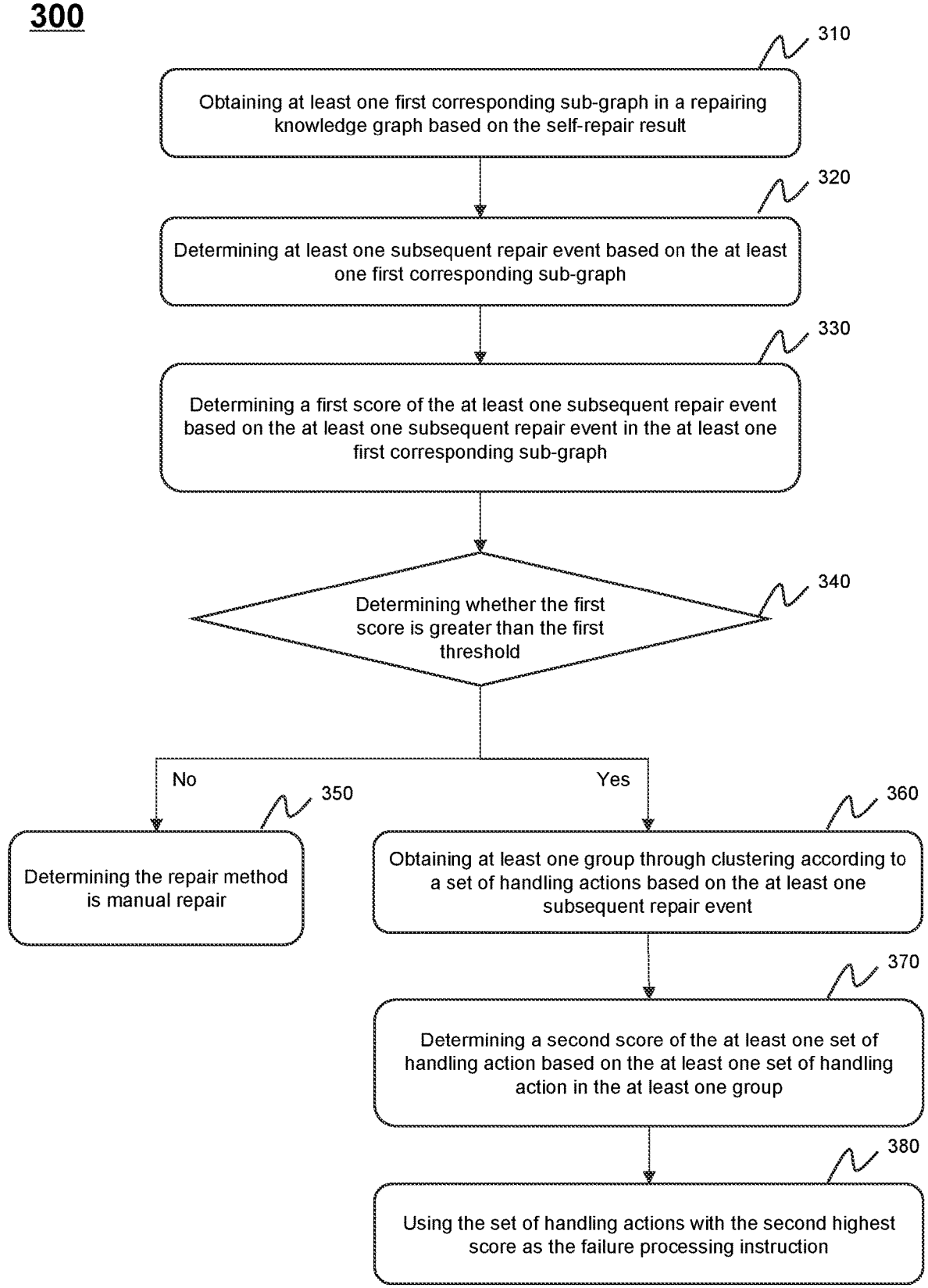
FIG. 3 illustrates an exemplary flowchart of determining a repair method based on a self-repair result according to some embodiments of the present disclosure.

FIG. 3 illustrates an exemplary flowchart of determining a repair method based on a self-repair result according to some embodiments of the present disclosure. As shown in FIG. 3, the process 300 may include the following operations. In some embodiments, one or more operations of the process 300 shown in FIG. 3 may be implemented in the Industrial Internet of Things for handling failure of an assembly line equipment shown in FIG. 1. For example, the process 300 shown in FIG. 3 may be implemented in sub-platforms of the management platform. As another example, the process 300 shown in FIG. 3 may be stored in a storage device in the form of instructions invoked and/or executed by a processor.

In operation 310, at least one first corresponding sub-graph in a repairing knowledge graph may be obtained based on the self-repair result.

The self-repair result may refer to information that may reflect the situation before and after the self-repair. In some embodiments, the self-repair result may include a component, a first failure code, a handling action, and a second failure code. The first failure code may be the failure code before self-repair, and the second failure code may be the failure code after self-repair.

In some embodiments, when the failure type corresponding to the second failure code is no failure, it means that the repair may be completed through self-repair, and the determined repair method is that no further repair is required. In some embodiments, when the failure type corresponding to the second failure code is not no failure, it means that the repair may not be completed through self-repair, and it is necessary to determine whether the repair method is intelligent repair or manual repair based on the self-repair result.

Figure 4:
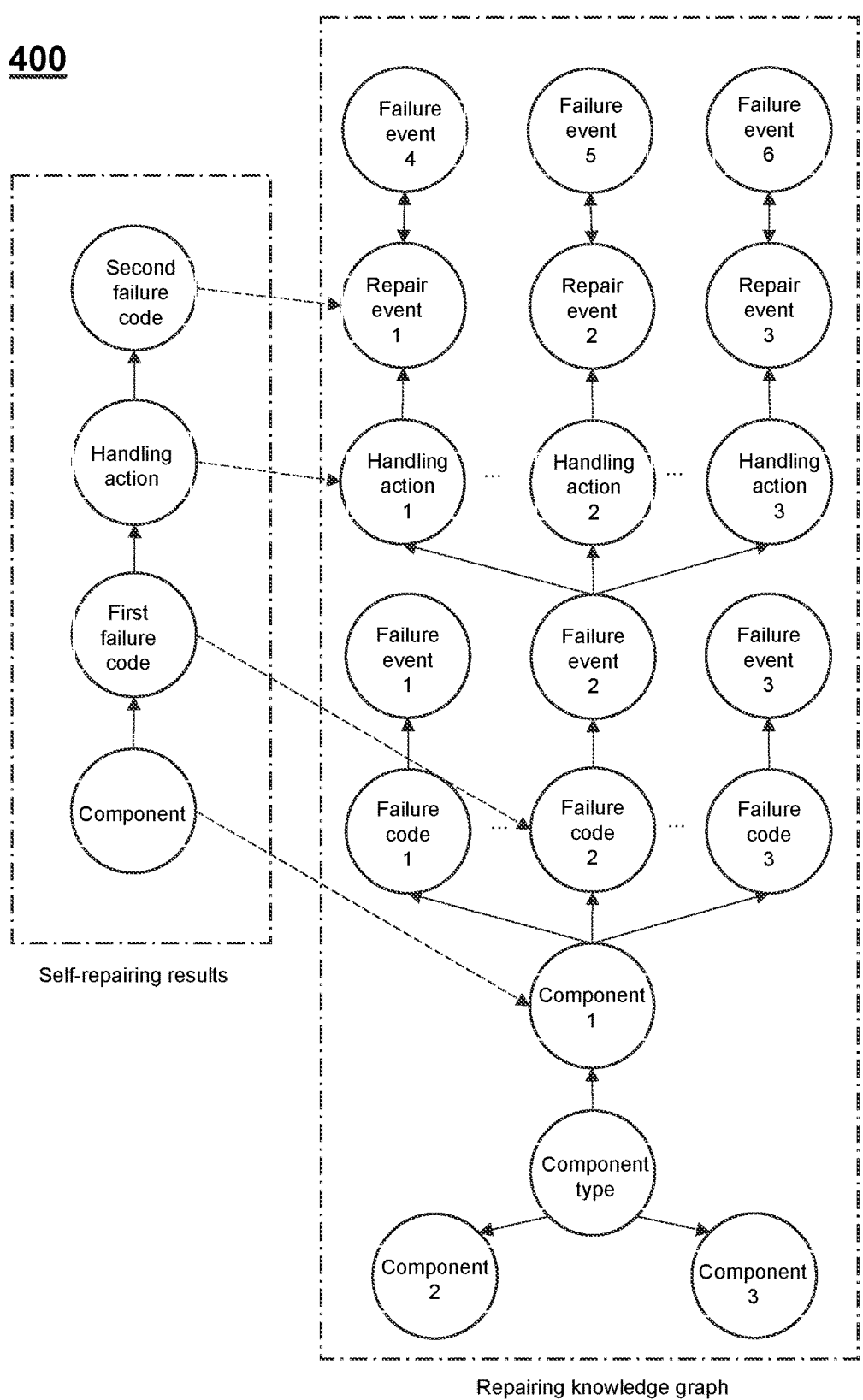
FIG. 4 illustrates an exemplary schematic diagram of determining the first corresponding sub-graph according to some embodiments of the present disclosure.

The repairing knowledge graph may refer to a knowledge graph that includes part or all of the information about component types, components, failure codes, failure events, handling actions, and repair events. In some embodiments, the repairing knowledge graph may include a plurality of nodes and a plurality of edges. In the repairing knowledge graph, the types of nodes may include component type nodes, component nodes, failure code nodes, failure event nodes, handling action nodes, and repair event nodes. For example, as shown in FIG. 4, the repairing knowledge graph may include nodes such as "component type", "component 1", "failure code 1", "failure event 1", "handling action 1", "repair event 1", or the like. The "component" with close enough functions and performance is the same "component type", and the attributes of "component" may include component model and component state attributes. The "failure code" may indicate what "failure event" has occurred, and the attribute of the "failure event" may include the number "n" of failures. The "handling action" may indicate the repair handling action for the "failure event". The "repair event" may represent the result of taking a "handling action" for the "failure event", and the attributes of the "repair event" may include repair success or repair failure. When the repair fails, the attributes of the "repair event" may include the repaired failure code.

In some embodiments, the plurality of nodes may be connected by edges, the edges may represent relationships between nodes, and attributes of the edges may include repairing times, repairing results, or the like. For example, the "failure code" and "component" may be connected based on an edge, and which "component" the "failure code" corresponds to may be determined based on the attributes of the edge. For another example, the "failure code" and the "failure event" may be connected based on the edges, and based on the attribute of the edge, it may be determined what "failure event" the "failure code" represents. For another example, the "handling action" and the "repair event" may be connected based on the one edge, and the obtained "repair event" may be determined after the "handling action" is executed based on the attribute of the edges. For another example, the "failure event" and the "repair event" may be connected based on one edge, and based on the attribute of the edge, it may be determined to perform repair based on the "failure event". For another example, the "repair event" and the "failure event" may be connected based on one edge, and the unrepaired result may be determined after the "repair event" based on the attribute of the edge. At this time, the failure code may be different from the failure code before the "repair event". For another example, a "component" and a "component type" may be connected based on one edge, and based on the attribute of the edge, it may be determined to which "component type" the "component" belongs.

In some embodiments, the processor may obtain a repairing knowledge graph based on historical repair situations. For example, based on the failure code, the processor may search for a repair situation matching the failure code through historical repair situations and determine the repairing knowledge graph based on manual marking and other methods.

The first corresponding sub-graph may refer to a graph obtained by dividing the repairing knowledge graph based on the self-repairing result.

In some embodiments, the processor may divide the repairing knowledge graph into a plurality of sub-graph based on the self-repairing result. In some embodiments, the processor may divide the repairing knowledge graph into the plurality of sub-graph based on whether the component model of the component in the self-repairing result is the same as the component model of the component in the repairing knowledge graph, and the similarity between the component state attribute of the component in the self-repairing result and the component state attribute of the component in the repairing knowledge graph, the similarity between the first failure code in the self-repairing result and the failure code in the repairing knowledge graph, the similarity between the handling action in the self-repairing result and the handling action in the repairing knowledge graph, and the similarity between the second failure code in the self-repairing result and the fault code corresponding to the repair event in the repairing knowledge graph. For example, as shown in FIG. 4, the "component" in the self-repairing result may have the same model and similar attributes as the "component 1" in the repairing knowledge graph, the "first failure code" in the self-repairing result is similar to the "failure code 2" in the repairing knowledge graph, the "handling action" in the self-repairing result is similar to the "handling action 1" in the repairing knowledge graph, and the "second failure code" in the self-repairing result is similar to the failure code corresponding to "repair event 1" in the repairing knowledge graph, so the sub-graph consisting of "component 1", "failure code 2", "failure event 2", "handling action 1", "repair event 1", "failure event 1", etc. may be one of the sub-graphs.

In some embodiments, the similarity of state attributes, the similarity of failure codes, and the similarity of handling actions may be obtained based on the first model. Taking the similarity of the state attributes as an example, the processor may use the first model to process the component state attributes of the components in the self-repairing result and the component state attributes of the components in the repairing knowledge graph to obtain the similarity of the state attributes. For example, the component state attribute of the component in the self-repairing result and the component state attribute of the component in the repairing knowledge graph may be input into the first model, and the first model outputs the similarity of the state attribute. The first model may be a Convolutional Neural Network (CNN), a Deep Neural Network (DNN) or the like. The first model may be trained using the component state attributes of the components in the historical self-repairing results and the component state attributes of the components in the repairing knowledge graph. The first model may be enabled to output the similarity of its corresponding state attribute based on the component state attribute of the component in the self-repairing result and the component state attribute of the component in the repairing knowledge graph. The labels corresponding to the training data may be determined by manual marking.

The obtaining process of the similarity of the failure code and the similarity of the handling action is similar to the obtaining process of the similarity of the state attribute, which may not be repeated here.

In operation 320, at least one subsequent repair event may be determined based on the at least one first corresponding sub-graph.

The subsequent repair event may refer to a repair event after the self-repairing in at least one first corresponding sub-graph. In some embodiments, the nodes of the at least one first corresponding sub-graph may include at least one subsequent repair event.

In some embodiments, the processor may determine subsequent repair events in the first corresponding sub-graph based on the sub-repairing results. Specifically, the processor may use the self-repaired repair event as a subsequent repair event based on the at least one first corresponding sub-graph.

In operation 330, a first score of the at least one subsequent repair event may be determined based on the at least one subsequent repair event in the at least one first corresponding sub-graph.

The first score may refer to a score reflecting the difficulty of repairing after self-repairing. For example, the difficulty of repairing may be expressed by a percentage, and the higher the score is, the easier the repair is.

In some embodiments, the processor may determine the first score of the at least one subsequent repair event based on the similarity of the sub-graph, the count of successful repair in the subsequent repair events, and the count of repair experienced in the successful repair of the subsequent repair events. The higher the similarity of the sub-graph is, the higher the judgment accuracy is, and the higher the first score is. The higher the count of successful repair in subsequent repair events is, the greater the possibility of successful repair is, and the lower the repair difficulty is, the higher the first score is. The smaller the count of repair experienced in the successfully repair of the subsequent repair events, the lower the difficulty of repair is, and the higher the first score is.

In some embodiments, the similarity of the sub-graph may be obtained based on the similarity of state attributes, the similarity of failure codes, and the similarity of handling actions. For example, the similarity of the sub-graph may be obtained from the weighted average of the similarity of state attributes, the similarity of failure codes, and the similarity of handling actions.

In some embodiments, the second model may be used to process similarity of sub-graph, the count of successful repair in subsequent repair events, and the count of repair experienced in the successfully repair of the subsequent repair events to obtain the first score. For example, the similarity of the sub-graph, the count of successful repair in the subsequent repair events, and the count of repair experienced in the successfully repair of the subsequent repair events may be input into the second model, and the second model may output the first score. The second model may be a convolutional neural network CNN, a deep neural network DNN, or the like. The second model may be trained by using the similarity of historical sub-graph, the count of successful repair in the subsequent repair events, and the count of repair experienced in the successfully repair of the subsequent repair events. This enables the second model to output its corresponding first score based on the similarity of the sub-graph, the count of successful repair in the subsequent repair events, and the count of repair experienced in the successfully repair of the subsequent repair events. The labels corresponding to the training data may be determined by manual marking.

In operation 340, it may be determined whether the first score is greater than the first threshold.

In some embodiments, the processor may determine whether the first score is greater than a first threshold (e.g., 70 points, 80 points, 90 points, etc.).

In response to a determination that the first score is less than or equal to the first threshold, the operation 350 may be performed.

In operation 350, it may be determined that the repair method is manual repair.

In some embodiments, the processor may determine that the repair method is manual repair based on the determination result that the first score is less than or equal to the first threshold.

More details on performing manual repair may be found in FIGS. 1-2 and their related descriptions.

In response to a determination that the first score is greater than the first threshold, the operations 360-380 may be performed.

In operation 360, at least one group may be obtained through clustering according to a set of handling actions based on the at least one subsequent repair event. The set of handling actions may refer to a set of handling actions corresponding to at least one subsequent repair event experienced in successfully repair. For example, a successful repair requires three subsequent repair events, and each subsequent repair event may correspond to one handling action, and the three handling actions may constitute one set of handling action.

A group may refer to a set of subsequent repair events corresponding to the same set of handling actions. For example, in the first of the first corresponding sub-graph, the repair may be successful after experiencing the subsequent repair event 1 (corresponding to handling action 1), subsequent repair event 2 (corresponding to handling action 2), and subsequent repair event 3 (corresponding to handling action 3). In the second of the first corresponding sub-graph, the repair may be successful after experiencing the subsequent repair event 4 (corresponding to handling action 1), the subsequent repair event 5 (corresponding to handling action 2), and the subsequent repair event 6 (corresponding to handling action 3). Then the subsequent repair event 1, subsequent repair event 2, and subsequent repair event 3 in the first of the first corresponding sub-graph, and the subsequent repair event 4, subsequent repair event 5, and subsequent repair event 6 in the second of the first corresponding sub-graph may be divided into the same group.

In some embodiments, the processor may divide subsequent repair events corresponding to the same set of handling actions into a group. For example, the processor may divide subsequent repair events corresponding to the set of handling action 1 into group 1 and divide subsequent repair events corresponding to the set of handling action 2 into group 2.

In operation 370, a second score of the at least one set of handling action may be determined based on the at least one set of handling action in the at least one group.

The second score may refer to a score reflecting the repair success rate after self-repairing. For example, the repair success rate of repair may be reflected in a percentage system, and the higher the score is, the higher the repair success rate is.

In some embodiments, the processor may determine a second score of the at least one set of processing actions based on the similarity of the sub-graph, the count of the same set of handling actions in each group, and the probability of success after each group is handled by the same set of handling actions. The higher the similarity of the sub-graph is, the higher the judgment accuracy is, and the higher the second score is. The greater the count of the same set of handling actions in each group is, the greater the probability of success after each group is handled by the same set of handling actions, indicating that the repair success rate is greater, and the second score is higher.

In some embodiments, a third model may be used to process the similarity of the sub-graph, the count of the same set of handling actions in each group, and the rate of success after each group is handled by the same set of handling actions to obtain the second score. The training process of the third model is similar to the training process of the second model, which may not be repeated here.

In operation 380, the set of handling actions with the second highest score may be used as the failure handling instruction.

The failure handling instruction may refer to a set of handling actions in the intelligent repair process.

In some embodiments, the processor may use the set of handling actions with the second highest score determined in operation 370 as the failure handling instruction. The set of handling actions with the highest repair success rate may be used as the failure handling instruction.

In some embodiments, the processor may determine whether the second score is less than a second threshold. In response to a determination that the second score is less than the second threshold, a larger range of second corresponding sub-graph may be obtained in the repairing knowledge graph. The second threshold may be greater than the first threshold (for example, if the first threshold is 80 points, the second threshold may be 90 points).

In some embodiments, the processor may compare the second score determined in operation 370 with a second threshold to determine whether the second score is less than the second threshold.

If the second score is less than the second threshold, it indicates that the success rate of the set of handling actions is not high enough. Therefore, the second corresponding sub-graph may be obtained by expanding the range of searching the corresponding sub-graph in operation 310 to obtain more second corresponding sub-graphs, so as to avoid excluding the set of handling actions with a higher second score caused by the too small range of the first corresponding sub-graph, thereby improving the success rate of the set of handling actions.

In some embodiments, the processor may not require that the component model of the component in the self-repairing result is the same as the component model of the component in the repairing knowledge graph. It is only necessary that the component model of the component in the self-repairing result and the component model of the component in the repairing knowledge graph may be connected to the same component type. Thereby, a wider range of the second corresponding sub-graph may be obtained in the repairing knowledge graph. In some embodiments, the processor may reduce the similarity between the component state attribute of the component in the self-repairing result and the component state attribute of the component in the repairing knowledge graph, so as to obtain a wider range of second corresponding sub-graph in the repairing knowledge graph.

By the repairing knowledge graph, it is possible to accurately determine whether the repair method is intelligent repair or manual repair. Therefore, on the basis of ensuring the success rate of intelligent repair, the count of manual repairs may be reduced, thereby reducing the cost of manual troubleshooting. In addition, the set of handling actions with the highest success rate may be determined as the failure handling instruction by the clustering method, which may improve the success rate of repair.

It should be noted that the above description about the process 300 is only for example and illustration, and not limit the scope of application of the present disclosure. For those skilled in the art, various modifications and changes may be made to the process 300 under the guidance of the present disclosure. However, these modifications and changes are still within the scope of the present disclosure.

In some embodiments, a computer-readable storage medium may be used for storing computer instructions, when reading the computer instructions in the storage medium, a computer implements the control method of the Industrial Internet of Things for handling failure of the assembly line equipment.

Those of ordinary skill in the art can realize that the units and algorithm steps of each example described in conjunction with the embodiments disclosed herein can be implemented with electronic hardware, computer software, or a combination of the two, in order to clearly illustrate the hardware and software interchangeability, the components and steps of each example have been generally described in terms of functions in the above description. Whether these functions are performed in hardware or software depends on the specific application and design constraints of the technical solution. Skilled artisans may implement the described functionality using different methods for each particular application, but such implementations should not be considered beyond the scope of the invention.

In the several embodiments provided in the application, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features may be omitted, or not implemented. In addition, the shown or discussed mutual coupling or direct coupling or communication connection may be indirect coupling or communication connection through some interfaces, devices or units, and may also be electrical, mechanical or other forms of connection.

The units described as separate components may or may not be physically separated. Those of ordinary skill in the art can realize that the units and algorithm steps of each example described in conjunction with the embodiments disclosed herein can be It is realized by electronic hardware, computer software or a combination of the two. In order to clearly illustrate the interchangeability of hardware and software, the components and steps of each example have been generally described in terms of functions in the foregoing description. Skilled artisans may implement the described functionality using different methods for each particular application, but such implementations should not be considered beyond the scope of the present invention.

In addition, each functional unit in each embodiment of the invention may be integrated into one processing unit, or each unit may exist physically alone, or two or more units may be integrated into one unit. The above-mentioned integrated units may be implemented in the form of hardware or may be implemented in the form of software functional units.

If the integrated unit is implemented in the form of a software functional unit and sold or used as an independent product, it may be stored in a computer-readable storage medium. Based on such understanding, the technical solution of the invention is essentially or a part that contributes to the prior art, or all or part of the technical solution can be embodied in the form of a software product, and the computer software product is stored in a storage medium, including several instructions for causing a computer device (which may be a personal computer, a server, or a grid device, etc.) to execute all or part of the steps of the methods described in the various embodiments of the present invention. The aforementioned storage medium includes: U disk, removable hard disk, Read-Only Memory (ROM), Random Access Memory (RAM), magnetic disk or optical disk and other media that can store program codes.

The specific embodiment described above, the purpose of the invention, technical scheme and beneficial effect have been described in further detail, it should be understood that the above is only the specific embodiment of the invention, and is not intended to limit In the protection scope of the invention, any modification, equivalent replacement, improvement, etc. made within the spirit and principle of the invention shall be included within the protection scope of the invention.

What is claimed is:

1. An Industrial Internet of Things for handling failure of an assembly line equipment, comprising: a user platform, a service platform, a management platform, a sensor network platform, and an object platform interacting in sequence, wherein the service platform, the management platform, and the sensor network platform all adopt an independent arrangement composed of a plurality of sub platforms with a same number, and the independent arrangement means that the service platform, the management platform, or the sensor network platform uses different sub-platforms for data storage, data processing, and/or data transmission for data of different object platforms;

the object platform is configured as a plurality of manufacturing equipment arranged in sequence according to a process sequence on the assembly line, the plurality of sub-platforms of different platforms form a one-to-one correspondence between upper and lower levels, and the sensor network platform, management platform, and service platform corresponding to each one-to-one correspondence all correspond to a same manufacturing equipment; when any of the manufacturing equipment fails, the manufacturing equipment uploads a failure code to sub-platforms of the sensor network platform;

sub-platforms of the management platform are configured to receive a configuration file sent by the sub-platforms of the sensor network platform, pre-store a failure code table corresponding to the manufacturing equipment, the failure code table at least including the failure code, and a failure type and a self-repair instruction package corresponding to the failure code, and after receiving the configuration file, extract the failure code in the configuration file and match the failure code with the failure code table, retrieve the failure type and the self-repair instruction package corresponding to the failure code, and package the failure code, failure type, and the self-repair instruction package as the identification result; and issue a self-repair instruction to the sub-platforms of the sensor network platform based on an identified result, wherein the sub-platforms of the sensor network platform converts the self-repair instruction into a self-repair instruction file recognized by the manufacturing equipment and issues the self-repair instruction file to the manufacturing equipment, and the manufacturing equipment performs a self-repair based on the self-repair instruction file and feeds back a self-repair result to the sub-platforms of the management platform; and analyze the self-repair result, when the self-repair result is not repaired, upload the identified result and the self-repair result to sub-platforms of the service platform, wherein the sub-platforms of the service platform synchronously send the identified result and the self-repair result to the user platform;

the user platform is configured to obtain the failure handling instruction based on the identified result and the self-repair result, and sequentially send the failure handling instruction to the sub-platforms of the sensor network platform through the sub-platforms of the service platform and the sub-platforms of the management platform in turn; and the sub-platforms of the sensor network platform is configured to convert the failure code into the configuration file identifiable by the management platform, and send the configuration file to the sub-platforms of the management platform; and convert the failure handling instruction into a failure handling instruction file identifiable by the manufacturing equipment, and issue the failure handling instruction file to the manufacturing equipment, and the manufacturing equipment executes a failure handling based on the failure handling instruction file.

2. The Industrial Internet of Things for handling failure of the assembly line equipment according to claim 1, wherein the self-repair instruction issued by the sub-platforms of the management platform at least include the self-repair instruction package, and after receiving the self-repair instruction file, the manufacturing equipment extracts the self-repair instruction operation program data in the self-repair instruction package to perform self-repair.

3. The Industrial Internet of Things for handling failure of the assembly line equipment according to claim 1, wherein the failure code table also includes an estimated failure handling time corresponding to the failure code, the sub-platforms of the management platform are further configured to:

package the estimated failure handling time, the failure code, the failure type, and the self-repair instruction package as the identification result and upload the identification result to the sub-platforms of the service platform, and take a previous manufacturing equipment of failed manufacturing equipment as a target object, wherein the sub-platforms of the management platform corresponding to the target object obtain a temporary storage amount of products of the target object and a production time of a single product, and upload the temporary storage amount of products of the target object and the production time of the single product to the sub-platforms of the service platform corresponding to the target object;

the user platform is further configured to:

retrieve the temporary storage amount of products and the production time of the single product of the sub-platforms of the service platform corresponding to the target object;

extract the estimated failure handling time of the identification result, and calculate a total product production amount of the target object within the estimated failure handling time through the estimated failure handling time and the production time of the single product;

determine whether to activate a standby manufacturing equipment and use a determination result as a part of the failure handling instruction based on a difference between the total product production amount and the temporary storage amount of products; and when the sub-platforms of the management platform of the failed manufacturing equipment receive the failure handling instruction and issue the failure handling instruction to the sub-platforms of the sensor network platform at the same time, determine whether to execute a step of enabling the standby manufacturing equipment based on the determination result.

4. The Industrial Internet of Things for handling failure of the assembly line equipment according to claim 3, wherein to determine whether to execute a step of enabling the standby manufacturing equipment based on the determination result, the at least one processor is executed to operations including:

the standby manufacturing equipment and the failed manufacturing equipment sharing one sub-platform of same management platform and one sub-platform of the sensor network platform;

when the determination result is to enable the standby manufacturing equipment, the sub-platforms of the management platform generating an enabling command and sending the enabling command to the sub-platforms of the sensor network platform corresponding to the standby manufacturing equipment; and after converting the enabling command, the sub-platforms of the sensor network platform corresponding to the standby manufacturing equipment sending it to the standby manufacturing equipment, and the standby manufacturing equipment starting to replace the failed manufacturing equipment to manufacture products based on the enabling command.

5. The Industrial Internet of Things for handling failure of the assembly line equipment according to claim 3, wherein the failure code table further includes a production time of a single product corresponding to the failed manufacturing equipment;

the sub-platforms of the management platform are further configured to sum the estimated failure handling time corresponding to the failure code and the production time of the single product corresponding to the failed manufacturing equipment as a final estimated failure handling time; and the user platform is configured to calculate the total product production amount of the target object through the final estimated failure handling time and the production time of the single product of the target object.

6. A control method of an Industrial Internet of Things for handling failure of an assembly line equipment, the Industrial Internet of Things for handling failure of the assembly line equipment comprising: a user platform, a service platform, a management platform, a sensor network platform, and an object platform interacting in sequence; wherein the service platform, the management platform and the sensor network platform all adopt an independent arrangement composed of a plurality of sub platforms with a same number, and the independent arrangement means that the service platform, the management platform, or the sensor network platform uses different sub-platforms for data storage, data processing, and/or data transmission for data of different object platforms;

the object platform is configured as a plurality of manufacturing equipment arranged in sequence according to a process sequence on the assembly line, the plurality of sub-platforms of different platforms form a one-to-one correspondence between upper and lower levels, and the sensor network platform, management platform, and service platform corresponding to each one-to-one correspondence all correspond to a same manufacturing equipment;

the control method comprises:

when any of the manufacturing equipment fails, uploading a failure code to sub-platforms of the sensor network platform by the manufacturing equipment;

converting the failure code into a configuration file identifiable by the management platform, and sending the configuration file to the sub-platforms of the management platform by the sub-platforms of the sensor network platform;

sub-platforms of the management platform pre-storing a failure code table corresponding to the manufacturing equipment, the failure code table at least including the failure code, and a failure type and a self-repair instruction package corresponding to the failure code, and after receiving the configuration file, extracting the failure code in the configuration file and match the failure code with the failure code table, retrieving the failure type and the self-repair instruction package corresponding to the failure code, and packaging the failure code, failure type, and the self-repair instruction package as the identification result, and issuing a self-repair instruction to the sub-platforms of the sensor network platform based on an identified result, wherein the sub-platforms of the sensor network platform converts the self-repair instruction into a self-repair instruction file recognized by the manufacturing equipment and issues the self-repair instruction file to the manufacturing equipment, and the manufacturing equipment performs a self-repair based on the self-repair instruction file, and feeds back a self-repair result to the sub-platforms of the management platform;

the sub-platforms of the management platform analyzing the self-repair result, when the self-repair result is not repaired, uploading the identified result and the self-repair result to sub-platforms of the service platform, wherein the sub-platforms of the service platform synchronously send the identified result and the self-repair result to the user platform;

the user platform issuing the failure handling instruction based on the identified result and the self-repair result, and sequentially sending the failure handling instruction to the sub-platforms of the sensor network platform through the sub-platforms of the service platform and the sub-platforms of the management platform in turn; and the sub-platforms of the sensor network platform converting the failure handling instruction into a failure handling instruction file identifiable by the manufacturing equipment and issuing the failure handling instruction file to the manufacturing equipment, and the manufacturing equipment executing a failure handling based on the failure handling instruction file.

\* \* \* \* \*